Figure 1:
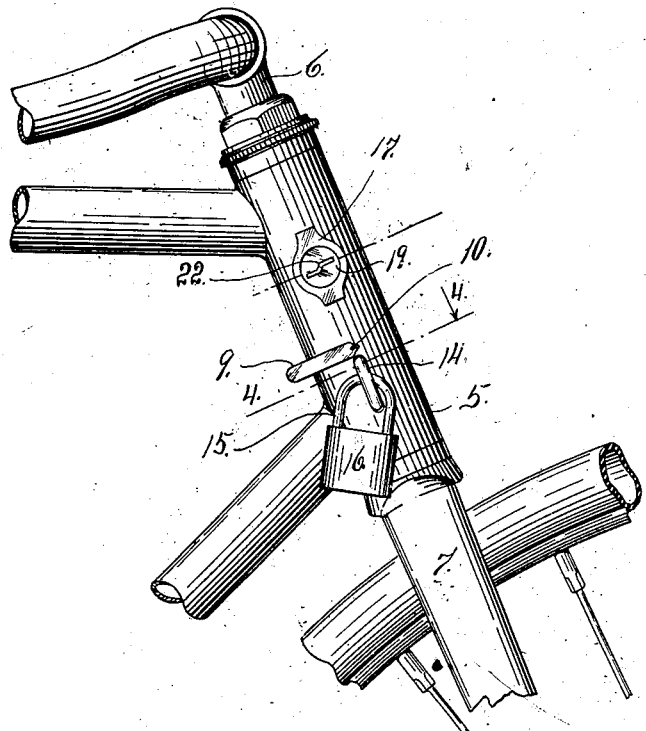

C. H. MYERS.
BICYCLE LOCK.
APPLICATION FILED NOV. 17, 1908.

977,533.

Patented Dec. 6, 1910.

Witnesses
J. D. Thornburgh.
Otto E. Hoddick.

Inventor
Clarence H. Myers.

By

Attorney

UNITED STATES PATENT OFFICE.

CLARENCE H. MYERS, OF DENVER, COLORADO.

BICYCLE-LOCK.

977,533.

Specification of Letters Patent. Patented Dec. 6, 1910.

Application filed November 17, 1908. Serial No. 463,104.

*To all whom it may concern:*

Be it known that I, CLARENCE H. MYERS, a citizen of the United States, residing in the city and county of Denver and State of Colorado, have invented certain new and useful Improvements in Bicycle-Locks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in locks for bicycles or other velocipedes or vehicles having a head or sleeve in which a steering post or shaft is mounted to rotate for steering purposes.

The invention as illustrated in the drawing is shown applied to a bicycle though it must be understood that it may be employed in all similar relations.

In my improved construction provision is made for locking the steering post against rotary movement in the head of the machine; thus making it impossible for an unauthorized person to ride the wheel away since he cannot steer the machine.

I am aware that various devices may be employed to accomplish this purpose. In the drawing I have illustrated a specific form of lock, consisting of a key passed through registering openings in the steering post and the head, one protruding extremity of the key having an opening to receive the hasp of a padlock.

Other forms of locking devices adapted to accomplish the desired purpose will readily occur to those skilled in the art to which the invention relates.

Having briefly outlined my improved construction I will proceed to describe the same in detail, reference being made to the accompanying drawing in which is illustrated an embodiment thereof.

Figure 2:
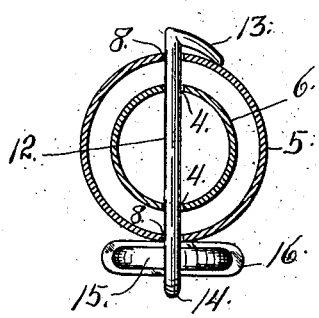
Figure 3:
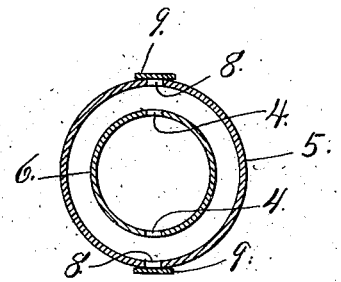

In this drawing, Figure 1 is a fragmentary view of a bicycle showing the head and the front fork, with which the steering post is connected. Fig. 2 is a cross section taken on the line 4—4 Fig. 1 viewed in the direction of the arrow, the parts being shown on a larger scale. Fig. 3 is a section similar to Fig. 2 but with the locking device removed.

The same reference characters indicate the same parts in all the views.

Let the numeral 5 designate the head and 6 the steering post connected with the front fork 7 of a bicycle or other velocipede or vehicle, or other structure where a steering post movably mounted in a head or sleeve is required. The steering post 6 and the head 5 are provided with registering slots 4 and 8 respectively. When the lock is not in use, the slots 8 of the steering head are covered by plates 9 pivotally connected with the head as shown at 10. In order to lock the bicycle, a key 12 having a bent or hook-shaped head 13 at one extremity, is passed through the registering slots 4 and 8, the head 13 forming a stop at one end of the key, while the opposite end of the latter protrudes from the head as shown at 14 and is apertured to receive the hasp 15 of a padlock 16. When the hasp in the padlock is passed through the opening in the protruding extremity 14 of the key and locked, it is evident that the steering post is secured against movement in the head and no one but the person holding the key to the padlock can remove the lock and use the bicycle.

Having thus described my invention, what I claim is:

In a bicycle lock, the combination of a head or sleeve and a steering post or shaft normally movable in the head or sleeve for steering purposes, the said post and sleeve having openings therethrough which register when the said parts are in a predetermined position, and means for locking the post within the head or sleeve to prevent independent rotary movement of the post, said means comprising a key adapted to pass through the openings in both members, and protruding on opposite sides, one extremity of the key having a stop to prevent it from passing through on one side; while the other extremity is provided with an eye, and a padlock whose hasp is passed through said eye.

In testimony whereof I affix my signature in presence of two witnesses.

CLARENCE H. MYERS.

Witnesses:
A. J. O'BRIEN,
A. EBERT O'BRIEN.